L. C. BECK.
SANITARY REFUSE TRAP.
APPLICATION FILED NOV. 9, 1916.
1,248,996.
Patented Dec. 4, 1917.
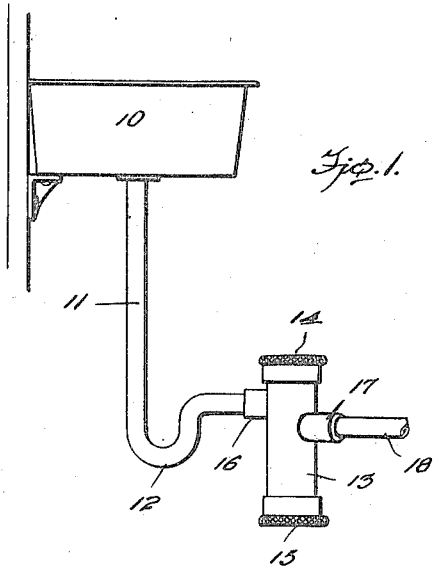
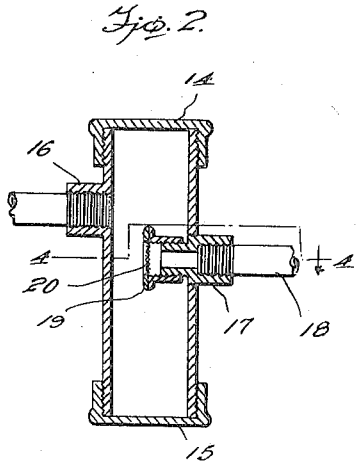
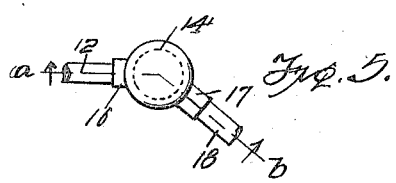
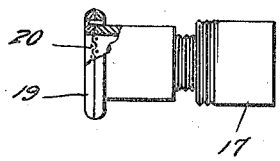
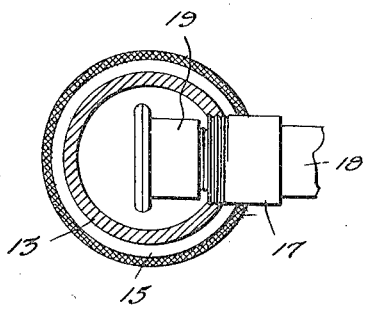
Inventor
L. C. Beck.
By Talbert & Parker
Attorneys

UNITED STATES PATENT OFFICE.

LYLE C. BECK, OF WINDSOR, ILLINOIS.

SANITARY REFUSE-TRAP.

1,248,996. Specification of Letters Patent. Patented Dec. 4, 1917.

Application filed November 9, 1916. Serial No. 130,438.

*To all whom it may concern:*

Be it known that I, LYLE C. BECK, a citizen of the United States, residing at Windsor, in the county of Shelby and State of Illinois, have invented certain useful Improvements in Sanitary Refuse-Traps, of which the following is a specification, reference being had therein to the accompanying drawing.

The present invention relates to traps for refuse and the like, and has particular reference to a trap of this nature for application to pipes for preventing the choking or clogging up of the pipes.

The invention has for an object to provide a trap which may be readily applied to the usual drainage pipes of sinks and the like for catching refuse, sediment and the like which passes through the ordinary U-bend trap now employed, and which frequently collects in the pipes and chokes the same.

It is also a purpose of this invention to provide a relatively simply constructed trap to which access may be easily gained by merely removing caps from the opposite ends of the body of the trap so that the body may be easily flushed out and cleaned without removing the trap from the pipe.

The above and other objects and advantages of this invention will be more clearly brought out in the following specific description of the present preferred embodiment of this invention, the same being illustrated in the accompanying drawings, wherein—

Figure 1 is a side elevation of a sink, with its drainage pipe, and having the improved refuse trap of this invention applied thereto;

Fig. 2 is a detail enlarged vertical section taken centrally through the trap, showing the detachable caps on the opposite ends thereof, and showing the relative location of the inlet and outlet nipples on the upper end of the trap;

Fig. 3 is a detail sectional view of the outlet nipple and the detachable screen carried thereby;

Fig. 4 is a transverse section taken on the line 4—4 of Fig. 2, looking in the direction of the arrow and showing the arrangement of the outlet screen in the trap body.

Fig. 5 is a top plan view of the trap.

Referring to these drawings, wherein similar parts are designated by like numerals of reference throughout the different views, 10 designates a sink or wash basin of usual construction, provided with a drain pipe 11 in the usual manner, having the U-bend 12 which constitutes the common form of trap.

The device of this invention is adapted for attachment to this pipe 11 at any point of its length, beyond the U-bend 12, and is shown in Fig. 1 as having connection with the drainage pipe at a point near the U-bend 12. The trap of this invention comprises a vertically disposed preferably cylindrical casing or body 13 open at its upper and lower ends and provided at said ends with external screw threads. The top of the casing 13 is closed by a detachable cap 14, and the bottom of the body is closed by a second detachable cap 15. These caps 14 and 15 are of similar size and construction and are suitably threaded for engagement over the opposite ends of the casing 13. The caps 14 and 15 may be knurled or provided with other means for ready grasping by the fingers to permit of the easy removal and positioning of the caps.

This vertical body 13 is provided in one side, and adjacent to its upper end, with an outstanding nipple 16 into which may be threaded the end of the drainage pipe 11. In the side of the body 13 out of line from the nipple 16, and in a plane below that of said nipple, is an outlet nipple 17 to which may be attached an outlet pipe 18. The inner end of the nipple 17 projects beyond the inner wall of the casing 13 and is externally screw threaded for detachably receiving thereon a strainer cap 19. The strainer cap 19 is provided in its closed end with a suitable screen 20 which is spaced from the inner wall of the casing 13 and is adapted to receive outflowing water from the casing and to prevent passage of suspended particles. By insertion of the fingers downwardly through the top of the casing 13, when the upper cap 14 is removed, the strainer cap 19 may be disengaged from the nipple 17 for the purpose of cleansing the cap 19.

In use, water passes from the basin or sink 10 through the drainage pipe 11 and into the casing 13 near its upper end. The water descends and whirls around to the outlet nipple 17, the difference in the positions of the inlet nipple 16 and the outlet nipple 17 insuring the settling of sediment and refuse carried in the water to the bottom of the casing 13. The water after depositing the refuse and sediment passes out through the screen 20 and into the outlet pipe 18.

From time to time the caps 14 and 15 may be removed from the casing and the sediment collected in the casing cleansed out by flushing water or the like through the open ended casing 13. The screen 19 may be easily removed from the casing and cleansed in any convenient manner before replacing.

It is of course understood that various changes and modifications may be made in the above specifically described form of trap without departing from the spirit of the invention, such changes and modifications being limited only by the scope of the following claim.

Having thus described my invention, I claim:

In a device of the class described, in combination, a cylindrical casing open at its upper and lower ends, an integral nipple projecting at right angles to the casing near its upper end, said casing having a threaded opening diametrically opposite said nipple but below the same, caps removably closing the ends of said casing, a removable nipple threaded into said threaded opening and having a reduced threaded portion projecting into the casing, said last-named nipple having an internally threaded bore formed on its wider end, and a strainer cap threaded on to the reduced threaded portion of said last-named nipple and having its strainer disposed vertically in the opening.

In testimony whereof I affix my signature

LYLE C. BECK.

Copies of this patent may be obtained for five cents each, by addressing the "Commissioner of Patents, Washington, D. C."